(12) United States Patent
Miyazaki et al.

(10) Patent No.: US 9,129,198 B2
(45) Date of Patent: Sep. 8, 2015

(54) INFORMATION CODE AND INFORMATION CODE READER

(75) Inventors: Manabu Miyazaki, Nagoya (JP); Takao Ushijima, Toyoake (JP); Koji Konosu, Kariya (JP); Atsushi Tano, Kariya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 509 days.

(21) Appl. No.: 13/421,414

(22) Filed: Mar. 15, 2012

(65) Prior Publication Data

US 2013/0001310 A1    Jan. 3, 2013

(30) Foreign Application Priority Data

Jun. 29, 2011   (JP) .................. 2011-144667
Dec. 2, 2011    (JP) .................. 2011-264539

(51) Int. Cl.
*G06K 7/12*   (2006.01)
*G06K 19/06*  (2006.01)
*G06K 7/10*   (2006.01)

(52) U.S. Cl.
CPC ........ *G06K 19/0614* (2013.01); *G06K 7/10732* (2013.01)

(58) Field of Classification Search
USPC ................ 235/462.04, 494, 470, 469, 462.42
See application file for complete search history.

(56) References Cited

U.S. PATENT DOCUMENTS

| | | |
|---|---|---|
| 4,853,525 A | 8/1989 | Vogt et al. |
| 6,119,943 A | 9/2000 | Christy |
| 7,802,730 B2 | 9/2010 | Senda |

FOREIGN PATENT DOCUMENTS

| | | |
|---|---|---|
| FR | 2 682 790 A1 | 4/1993 |
| JP | A-2007-115105 | 5/2007 |
| WO | WO 96/18972 A1 | 6/1996 |

OTHER PUBLICATIONS

Extended European Search Report issued in European Patent Application No. 12159451.9 dated Apr. 15, 2013.
Jul. 18, 2013 Office Action issued in Singapore Patent Application No. 201201887-5.

*Primary Examiner* — Allyson Trail
(74) *Attorney, Agent, or Firm* — Oliff PLC

(57) ABSTRACT

Disclosed herein are an information code and an information code reader. In information code, a plurality of light-colored modules exhibiting the reflective characteristics of light color when light of a second wavelength band different from light of a first wavelength band is radiated and a plurality of dark-colored modules exhibiting the reflective characteristics of dark color when the light of a second wavelength band is radiated are arranged in a code region. The information code includes a masked portion disposed in a predetermined region of the code region in which light is intercepted and prevents the corresponding information code from being read, and configured to, when the light of a second wavelength band is radiated, allow light reflected from the modules of the corresponding code region to pass therethrough and thereby interrupt the light of a first wavelength band.

20 Claims, 13 Drawing Sheets

INFORMATION CODE AND INFORMATION CODE READER

CROSS REFERENCE TO RELATED APPLICATION

The present application relates to and incorporates by reference Japanese Patent application Nos. 2011-144667 filed on Jun. 29, 2011 and 2011-264539 filed on Dec. 2, 2011.

BACKGROUND

1. Technical Field

The present invention relates to an information code and an information code reader.

2. Description of the Related Art

Recently, information codes, such as barcodes or QR Codes®, have been used for a variety of applications, and accordingly the uses thereof have diversified. In particular, since there is an increasing demand for the improved security of information codes currently, a technology is required that allows information codes to be read only when specific conditions are met. An example of a technology in which security functionality has been added to information codes is shown in, for example, Japanese Unexamined Patent Application Publication No. 2007-115105.

In the technology of the patent application, a frame is added to the margins of the location determination marks (location detection regions) of a QR (Quick Response) code, which makes the determination of the region of the QR code impossible. In greater detail, the frame is printed on an adhesive seal that can be removed from a base member on which the QR code has been printed, and the adhesive seal including the frame is attached to the margins, so that the presence of an object similar to the QR code can be recognized from the outside and the reading of the QR code is rendered impossible. When the adhesive seal is removed from the information code, the QR code becomes legible.

However, if the technology of that patent application is adopted to add security functionality, the following problem occurs. That is, when the adhesive seal is removed from the information code, the information code becomes a common type of information code from which information can be easily read. For this reason, the technology is problematic in that reading of the code cannot be reliably restricted to only a specific user or users.

SUMMARY

Accordingly, it is desired to provide an information code that cannot be read using an ordinary reader but can be reliably read using a specific information code reader, and the information code reader that is capable of reading the information code.

An exemplary embodiment provides an information code, in which a plurality of light-colored modules exhibiting reflective characteristics of light (bright) color (i.e., light reflection characteristics or high reflectivity) when light of a second wavelength band different from light of a first wavelength band is radiated and a plurality of dark-colored modules exhibiting reflective characteristics of dark color (i.e., dark reflection characteristics or low reflectivity) when the light of a second wavelength band is radiated are arranged in a code region, the information code having a masked portion disposed in a predetermined region of the code region in which light is intercepted and which prevents the corresponding information code from being read, and configured to, when the light of a second wavelength band is radiated, allow light reflected from the modules of the corresponding code region to pass therethrough and interrupt the light of a first wavelength band.

The information code allows the code region to be captured with the masked portion removed therefrom when the light of a second wavelength band is radiated. Accordingly, specific information can be read from the code region using the information code reader capable of radiating the light of a second wavelength band. Meanwhile, it is impossible or difficult to read corresponding information code using an ordinary reader because the code region cannot be completely captured because of the light interruption due to the masked portion. As a result, only a specific user who uses the information code reader can read the specific information, and therefore the security of the corresponding information code can be enhanced.

Accordingly, the reading of the corresponding information code by an ordinary reader is rendered difficult. In contrast, when the information code is read using the information code reader capable of radiating light of a second wavelength band, the information code can be read reliably.

In particular, even when a region surrounding the information code is copied by a copier or an ordinary camera, the code region cannot be copied in legible form (that is, in the form in which the light-colored modules and the dark-colored modules are separated from one another and reading is possible) because of the masked portion. Accordingly, the divulgence and dissemination of data based on the copying of the information code can be effectively prevented.

The code region may be configured such that a plurality of characters formed by arranging a plurality of light-colored modules and dark-colored modules is arranged in a direction of reading; and the masked portion may be disposed in the predetermined region to mask at least any one of a start character which is indicative of the start of reading and a stop character indicative of the end of reading.

Accordingly, at least any one of the two symbols cannot be read without using a specific reader capable of radiating the light of a second wavelength band, and therefore the corresponding information code can be further prevented from being read by an ordinary reader.

The corresponding information code may be a two-dimensional code in which location detection regions configured to specify locations within the code information code are included in the code region; and the masked portion may be disposed to mask the location detection regions as the predetermined regions.

Accordingly, the location detection regions cannot be recognized without using a specific reader capable of radiating the light of a second wavelength band, and therefore the corresponding two-dimensional code can be further prevented from being read by an ordinary reader.

The corresponding information code may be a two-dimensional code in which location detection regions configured to specify locations and format information regions configured to acquire format information for reading the corresponding information code are included in the code region; and the masked portion may be disposed to mask the location detection regions and/or the format information regions as the predetermined regions.

Accordingly, the location detection regions or format information regions cannot be read without using a specific reader capable of radiating the light of a second wavelength band, and therefore the corresponding two-dimensional code can be further prevented from being read by an ordinary reader.

The corresponding information code may be a two-dimensional code in which characteristic pattern regions formed in defined shapes at predetermined locations are included in the code region; and the masked portion may be disposed to mask some of the location detection regions as the predetermined region.

In this case, the characteristic pattern regions cannot be recognized without using the information code reader capable of radiating the light of a second wavelength band, thereby further preventing the corresponding two-dimensional code from being read using an ordinary reader.

Meanwhile, since the remaining regions of the characteristic pattern regions are not coated with the masked portion, a user can be visually notified of the presence of the corresponding characteristic pattern regions. For this reason, the user can recognize the locations of the characteristic pattern regions, so that the corresponding information code can be reliably read by accurately directing the reading unit of the information code reader toward the corresponding information code when the information code reader capable of radiating light of a second wavelength band is used.

The corresponding information code may be a two-dimensional code in which characteristic pattern regions formed in defined shapes at predetermined locations are included in the code region; and the masked portion may be disposed to mask an area other than the location detection regions.

Accordingly, the code region except for the location detection regions cannot be recognized without using a specific reader capable of radiating the light of a second wavelength band, and therefore the corresponding two-dimensional code can be further prevented from being read by an ordinary reader.

In the same way as described before, the characteristic pattern regions are not coated with the masked portion, a user can be visually notified of the presence of the corresponding the characteristic pattern regions. For this reason, the user can recognize the locations of the characteristic pattern regions, so that the corresponding information code can be reliably read by accurately directing the reading unit of the information code reader toward the corresponding information code when the information code reader capable of radiating light of a second wavelength band is used.

Even when the code region is not extracted and cannot be read from an image that is captured using a specific reader capable of radiating at least light of a second wavelength band while the light of a first wavelength band is being radiated, the characteristic pattern regions are extracted. In the case where the extracted characteristic pattern regions are location detection regions, when capturing is performed at the same location while the light of a second wavelength band is being radiated after the corresponding location detection regions have been captured, the location of the code region can be specified based on the extracted location detection regions. By doing so, the extraction of the location detection patterns is not necessary, so that the time it takes to read the corresponding information code can be shortened and the load of the reading process can be reduced.

The masked portion may be formed in the shape of a figure whose shape, pattern or color is varied. Even when the masked portion is formed in the shape of a specific figure as described above, the masked portion allows light, reflected from the code region when light of a second wavelength band is radiated, to pass therethrough, thereby realizing an information code having enhanced security and improved design.

The masked portion may be disposed to mask the entire code region. Accordingly, the user cannot view the original code region, and therefore the corresponding information code can be reliably prevented from being read by an ordinary reader that is used by the user.

The masked portion may be configured as another information code in which a plurality of light-colored (or bright-colored) modules exhibiting the reflective characteristics of light color when the light of a second wavelength band is radiated and a plurality of dark-colored module exhibiting the reflective characteristics of dark color when light of a second wavelength band is radiated are arranged and which has information different from information acquired from the code region.

As a result, the corresponding masked portion is read as a common information code by an ordinary reader, and therefore the code region coated with the masked portion cannot be read. In particular, when light of a second wavelength band is radiated, the code region can be captured. In contrast, when light of a first wavelength band is radiated, another information code can be captured. When the information code reader capable of radiating light of two wavelength bands is used, two types of information can be read from the space of a single information code, thereby achieving the efficiency of code space.

A second masked portion having transparency at a temperature higher than room temperature may be disposed in the predetermined region in addition to the masked portion. Accordingly, the code region cannot be captured to be read only by the radiation of the light of a second wavelength band, and the second masked portion needs to be higher than room temperature. For this reason, only a specific user who uses a specific reader capable of radiating light of a second wavelength band and heating the second masked portion can read specific information, thereby preventing the corresponding information code from being read by an ordinary reader.

The masked portion may be configured as a separate portion that can be added to the predetermined region when desired. Accordingly, an existing information code can be prevented from being read using an ordinary reader by coating the predetermined region of an existing information code with the masked portion configured as described above. In contrast, when reading is performed using the information code reader capable of radiating light of a second wavelength band, the information code can be reliably read.

The masked portion may be added by attaching a seal member to the predetermined region when desired. Accordingly, the predetermined region of an existing information code can be easily coated with the corresponding masked portion.

The masked portion may be added by applying ink onto the predetermined region when desired. Accordingly, the predetermined region of an existing information code can be easily coated with the corresponding masked portion.

Another exemplary embodiment provides a information code reader for optically reading the information code, including illumination means capable of radiating at least the light of a second wavelength band of the light of a first wavelength band and the light of a second wavelength band; capturing means for capturing the information code onto which one of the light of a first wavelength band and the light of a second wavelength band is radiated; and reading means for reading the corresponding code region based on an arrangement of the modules that are extracted from an image of the information code captured by the capturing means and that constitute the code region.

Accordingly, the corresponding code region is read by the reading means based on the arrangement of the modules of the code region that are extracted from an image of the code region that is captured by the capturing means while one of light of a first wavelength band and light of a second wavelength band is being radiated.

Accordingly, in the case where the information code is a reading target, when the information code is captured while light of a second wavelength band is being radiated, the code region is captured with the masked portion removed therefrom, and therefore the code region can be read regardless of the state of the masked portion. Meanwhile, when the information code is captured while light of a first wavelength band is being radiated, the code region is captured with the masked portion applied onto the predetermined region, and therefore the code region cannot be read.

Furthermore, in the case where an information code in which a plurality of light-colored modules exhibiting the reflective characteristics of light color when light of a first wavelength band is radiated and a plurality of dark-colored modules exhibiting the reflective characteristics of dark color when light of a first wavelength band is radiated are arranged in a code region and the code region is not coated with a masked portion, for example, when the light of a first wavelength band is visible light and a common information code is a reading target, the code region is captured by capturing the information code while the light of a first wavelength band is being radiated. Accordingly, unlike the above information codes, even an information code without a masked portion allows a code region thereof to be read.

Still another exemplary embodiment provides an information code reader for optically reading the information code in which the characteristic pattern regions are location detection regions configured to specify locations, the information code reader including illumination means capable of radiating at least the light of a second wavelength band of the light of a first wavelength band and the light of a second wavelength band; capturing means for capturing the information code onto which one of the light of a first wavelength band and the light of a second wavelength band is radiated by the illumination means; and reading means for specifying a location of the code region based on the location detection regions extracted from an image of the information code captured by the capturing means, and reading the corresponding code region based on an arrangement of the modules of the extracted code region whose location is specified; wherein the illumination means radiates the light of a second wavelength band if the location detection regions are extracted and the code region is not extracted from the image that is captured by the capturing means while the light of a first wavelength band is being radiated; and wherein the reading means, with respect to the image that is captured by the capturing means while the light of a first wavelength band is being radiated, specifies a location of the code region based on the location detection regions extracted while the light of a first wavelength band is being radiated, and reads the corresponding code region based on an arrangement of the modules of the extracted code region whose location is specified.

When the location detection patterns are extracted as characteristic pattern regions and the code region is not extracted from an image that is captured while light of a first wavelength band is being radiated, light of a second wavelength band is radiated by the illumination means. In the image captured in this manner, the location of the code region is specified based on the location detection patterns extracted while light of a first wavelength band is being radiated, and the corresponding code region is read based on the arrangement of the modules that constitute the extracted code region whose location is specified.

In the case where the above information code is a reading target, when the information code is captured while light of a first wavelength band is being radiated, the corresponding code region is not extracted and cannot be read even when the location detection patterns of the code region are extracted. In this case, when capturing is performed at the same capturing location while light of a second wavelength band is being radiated after the extraction of the location detection patterns, the location of the code region can be specified based on the extracted location detection patterns, as described above. By doing so, the extraction of the location detection patterns is not necessary, so that the time it takes to read the corresponding information code can be shortened and the load of the reading process can be reduced.

BRIEF DESCRIPTION OF THE DRAWINGS

The above and other objects, features and advantages of the present invention will be more clearly understood from the following detailed description taken in conjunction with the accompanying drawings, in which:

FIGS. 8A and 8B are diagrams illustrating an example of an information code according to a first variant of the fourth embodiment, wherein FIG. 8A illustrates the application of a base, and FIG. 8B is the printing of a QR code on the base;

FIG. 8B is a diagram illustrating the information code of FIG. 9A with a masked portion removed therefrom;

FIGS. 10A and 10B are diagrams illustrating an example of an information code according to a sixth embodiment, wherein FIG. 10A shows a code region with a masked portion separated therefrom, and FIG. 10B shows the code region whose part is coated with the masked portion;

DESCRIPTION OF THE PREFERRED EMBODIMENTS

Figure 1:
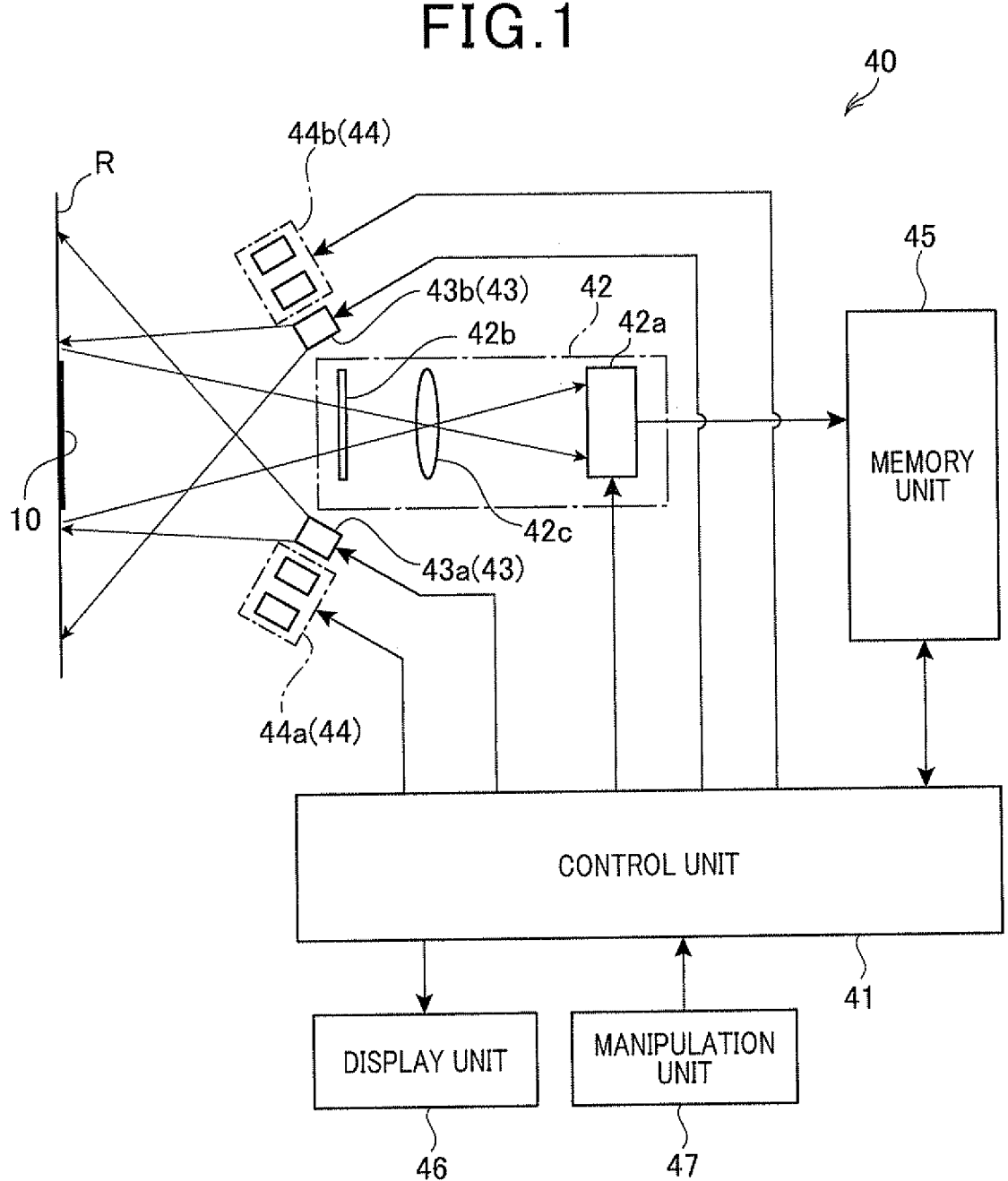
FIG. 1 is a block diagram schematically illustrating the principal components of an information code reader for reading an information code according to a first embodiment of the present invention.

Reference now should be made to the drawings, in which the same reference numerals are used throughout the different drawings to designate the same or similar components.

First Embodiment

A first embodiment in which information code according to the present invention has been embodied will be described below with reference to the drawings. FIG. 1 is a block diagram schematically illustrating the principal components of an information code reader 40 for reading an information code 10 according to the first embodiment of the present invention.

The information code reader 40 shown in FIG. 1 is configured to be able to optically read general information code, such as one-dimensional code (barcode, etc.) or two-dimensional code (QR code, data matrix code, MaxiCode, Aztec code, etc.) or the information code 10 of the present invention which has been attached to a reading target R. The information code 10 and the information code reader 40 will be described in detail below.

(Information Code Reader)

The information code reader 40 shown in FIG. 1 has the functionality of capturing and reading an information code attached to the reading target R. The information code reader 40 includes a control unit 41 formed of a Central Processing Unit (CPU), an imaging unit 42 formed of a camera including a light-receiving sensor (for example, a CMOS area sensor, or a CCD area sensor), first illumination light sources 43 for radiating light of a first wavelength band, second illumination light sources 44 configured to radiate light of a second wavelength band, and a memory unit 45 formed of memory means such as ROM, RAM, or non-volatile memory. The information code reader 40 further includes a display unit 46 formed of a liquid crystal display and a manipulation unit 47 formed of a variety of types of manipulation keys.

The imaging unit 42 is disposed between a set of first illumination light sources 43a and 43b. The imaging unit 42 functions to focus light, reflected from the reading target R or information code attached to the reading target R, on the light-receiving surface of the light-receiving sensor 42a and generate the image data of the information code. The light-receiving sensor 42a is configured to be able to receive light which is radiated onto and then reflected from the reading target R. The light-receiving sensor 42a corresponds to, for example, a line sensor in which light-receiving elements, that is, solid-state image pickup devices such as CMOSs or CCDs, are arranged in one dimension or an area sensor in which light-receiving elements are arranged in two dimensions. Furthermore, the imaging lens 42c includes, for example, a lens tube and a plurality of condensing lenses accommodated in the lens tube, and functions to form a code image of the information code on the light-receiving surface of the light-receiving sensor 42a. An image signal output from the light-receiving sensor 42a of the optical system is stored in, for example, the image data storage area of the memory unit 45.

The first illumination light sources 43 and the second illumination light sources 44 that constitute the illumination light sources (an illumination optical system) are disposed, for example, on both sides of the imaging unit 42 (a light-receiving optical system). A pair of first illumination light sources 43a and 43b are formed of Light-Emitting Diodes (LEDs) that radiate, for example, visible light having a wavelength in the range of 380 nm to 750 nm (hereinafter referred to as light of a first wavelength band). Furthermore, two pairs of second illumination light sources 44a and 44b are formed of LEDs that radiate infrared light having a wavelength equal to or greater than 750 nm (hereinafter referred to as light of a second wavelength band). Furthermore, in the present embodiment, the number of light sources of each of the second illumination light sources 44 is larger than that of the light sources of each of the first illumination light sources 43.

The memory unit 45 is a semiconductor memory device, and corresponds to, for example, RAM (DRAM, SRAM, or the like) and ROM (EPROM, EEPROM, or the like). In the memory unit 45, the RAM is configured to have not only the above-described image data storage area but also a work area that is used by the control unit 41 when the control unit 41 performs processing such as an arithmetic operation or a logic operation, and a reading condition table. The ROM stores a predetermined program capable of executing various types of processing and a system program capable of controlling hardware such as the illumination light sources and the light-receiving sensor 42a in advance.

The control unit 41 is formed of a microcomputer capable of controlling the entire information code reader 40, so that it includes a CPU, a system bus, and an input/output interface, and therefore has information processing functionality. Furthermore, in the present embodiment, the control unit 41 performs reading, and functions to extract a code region, occupied by an information code, from a code image of the corresponding information code captured by the imaging unit 42 and read the corresponding information code based on the results of the extraction.

Figure 2A:
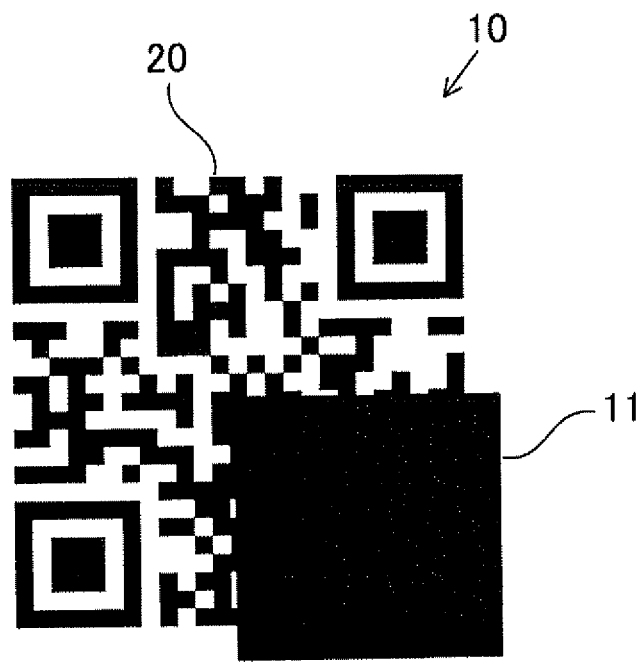
FIG. 2A is a diagram illustrating an example of an information code according to the first embodiment.
Figure 2B:
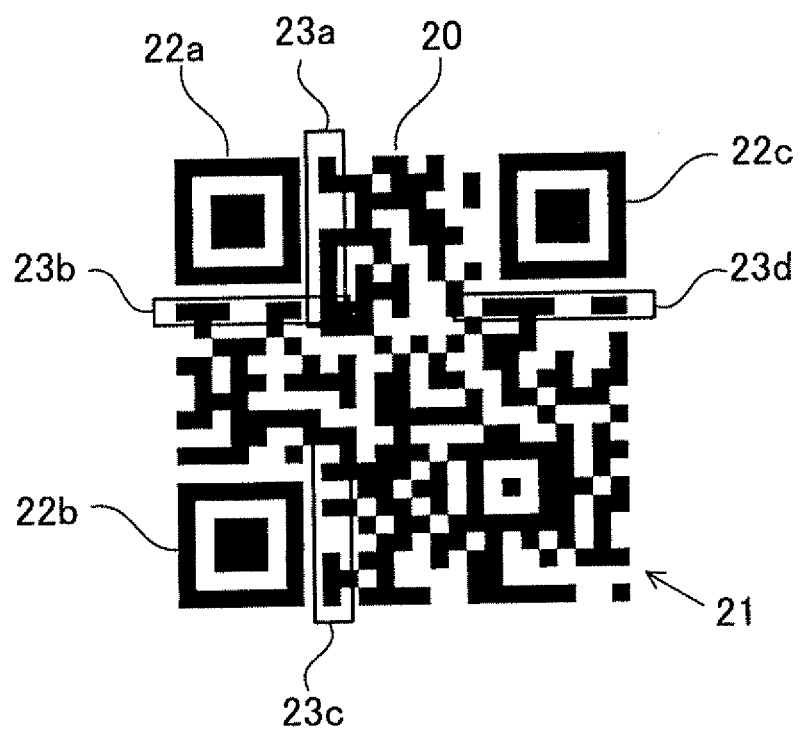
FIG. 2B is a diagram illustrating the information code of FIG. 2A with a masked portion removed therefrom.

FIG. 2A is a diagram illustrating an example of the information code 10 according to the first embodiment, and FIG. 2B is a diagram illustrating the information code 10 of FIG. 2A with a masked portion 11 removed therefrom.

As shown in FIG. 2A, the information code 10 includes a code region 20 formed of a plurality of light-colored modules and dark-colored modules and a masked portion 11 configured to mask a part of the code region 20.

As shown in FIG. 2B, the code region 20 is formed by arranging a plurality of square light-colored modules and square dark-colored modules in a matrix, like a QR code, and the overall code region 20 forms a square area.

In detail, the code region 20 includes a data region 21 configured to include the required necessary information, three location detection patterns 22a to 22c, and format codes 23a to 23d, like a QR code. The location detection patterns 22a to 22c are patterns configured to specify the location of the corresponding code region 20 with respect to the captured image data, and are disposed in three of the four corners of the code region 20. The format codes 23a to 23d are disposed near the location detection patterns 22a to 22c, and are configured to specify format information that is used to read the corresponding information code 10, such as the area of the data region 21, the type of code being used, the module size, the mask pattern, and the error correction rate. For this reason, if most of the data region 21 is concealed or the location detection patterns 22a to 22c or format codes 23a to 23d are concealed, the code region 20 cannot be read.

Each light-colored module of the modules constituting the code region 20 is configured to exhibit the reflective characteristics of light color when the module is irradiated with light of a first wavelength band in the visible light region or light of a second wavelength band different from the first wavelength. Each dark-colored module is configured to exhibit the reflective characteristics of dark color when the module is irradiated with light of a first wavelength band or light of a second wavelength band. More specifically, the modules that constitute the code region 20 are formed by applying ink that is commonly used.

The masked portion 11 is a predetermined region of the code region 20 that intercepts light and thereby prevents a corresponding code region 20 from being read. The masked portion 11 is disposed to mask most of the data region 21. The masked portion 11 is formed by applying ink that transmits light reflected from the modules of the code region 20 when the light of a second wavelength band is radiated and prevents the light of a first wavelength band from being transmitted, for example, infrared ray-transmittable ink. For this reason, in a normal state where visible light is dominant, most of the data region 21 is seen as being concealed by the masked portion 11, as shown in FIG. 2A. Furthermore, the masked portion 11 is disposed to mask, for example, 30% of the data region 21 to the extent that the corresponding code region 20 cannot be read even when error correction processing is performed.

Next, a specific example of the process of optically reading the above-described information code 10 using the information code reader 40 will be described.

First, when information to be used to initiate the reading process is input to the control unit 41 by manipulating the manipulation unit 47 of the information code reader 40, the control unit 41 performs control and light of a second wavelength band is radiated by the second illumination light sources 44. Furthermore, when the information code 10 is captured by the imaging unit 42 while the light of a second wavelength band is being radiated onto the information code 10, the light of a second wavelength band passes through the masked portion 11, and therefore the code region 20 is captured without the masked portion 11 interfering image capture.

Since the code region 20 captured with the masked portion 11 removed therefrom has a configuration identical to that of a typical QR code, the corresponding code region 20, that is, information code 10, is read by performing well-known decoding on the code region 20, thereby acquiring specific information.

Meanwhile, when the information code 10 is captured using an ordinary reader, the code region 20 is captured with the predetermined region covered with the masked portion 11. As a result, the code region 20 cannot be read, thereby preventing the corresponding information code 10 from being read by an ordinary reader.

As described above, in the information code 10 according to the present embodiment, the plurality of light-colored modules exhibiting the reflective characteristics of light color (i.e., light reflection characteristics or high reflectivity) when light of a second wavelength band is radiated and the plurality of dark-colored modules exhibiting the reflective characteristics of dark color (i.e., dark reflection characteristics or low reflectivity) when light of a second wavelength band is radiated are arranged in the code region 20. The masked portion 11 that allows light, reflected from the modules of the corresponding code region 20, to pass therethrough when light of a second wavelength band is radiated, thereby preventing light of a first wavelength band from passing therethrough, is disposed in the predetermined region of the code region 20.

The information code 10 configured as described above allows the code region 20 to be captured without interference from the masked portion 11 when the light of a second wavelength band is radiated. Accordingly, specific information can be read from the code region 20 using the information code reader 40 capable of radiating the light of a second wavelength band. Meanwhile, it is impossible or difficult to read the corresponding information code 10 using an ordinary reader because the code region 20 cannot be completely captured because of the interruption by the masked portion 11. As a result, only a specific user who uses the information code reader 40 can read the specific information, and therefore the security of the corresponding information code 10 can be enhanced.

Accordingly, the reading of the corresponding information code 10 by an ordinary reader is rendered difficult. In contrast, when the information code 10 is read using the information code reader 40 capable of radiating light of a second wavelength band, the information code 10 can be read reliably.

In particular, even when a region surrounding the information code 10 is copied by a copier or an ordinary camera, the code region 20 cannot be copied in legible form (that is, in the form in which the light-colored modules and the dark-colored modules are separated from one another and reading is possible) because of the masked portion 11. Accordingly, the divulgence and dissemination of data based on the copying of the information code 10 can be effectively prevented.

Figure 3:
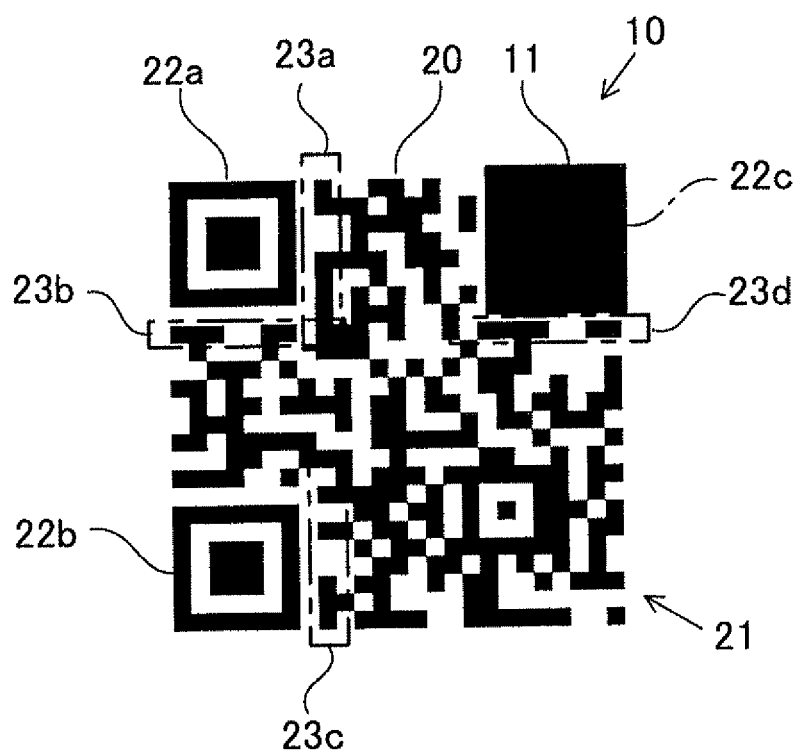
FIG. 3 is a diagram illustrating an example of an information code according to a first variant of the first embodiment.

FIG. 3 is a diagram illustrating an example of an information code 10 according to a first variant of the first embodiment.

In the first variant of the first embodiment, as shown in FIG. 3, a masked portion 11 may be disposed to mask the location detection pattern 22c as a predetermined region of the code region 20 in which light is intercepted and which prevents the corresponding code region 20 from being read. In this case, the code region 20 cannot be read without using the information code reader 40, thereby preventing the corresponding information code 10 from being read using an ordinary reader.

Furthermore, the above effects are achieved even when the masked portion 11 is disposed to mask at least one of the location detection patterns 22a to 22c or at least one of the format codes 23a to 23d. Furthermore, the location detection patterns 22a to 22c may correspond to examples of "location detection regions" described in the claims, and the format codes 23a to 23d may correspond to examples of "format information regions" described in the claims.

Furthermore, when the masked portion 11 is disposed to mask most of the data region or at least part of the location detection patterns of each code as the predetermined region that prevents the corresponding code region 20 from being read when the modules of the code region 20 are a data matrix code, a MaxiCode, or an Aztec code, the same effects can be achieved.

Figure 4A:
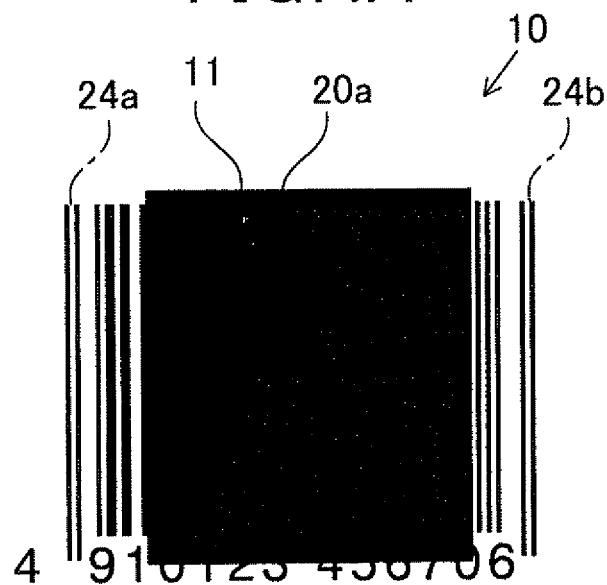
FIGS. 4A and 4B are diagrams illustrating an example of an information code according to a second variant of the first embodiment.
Figure 4B:
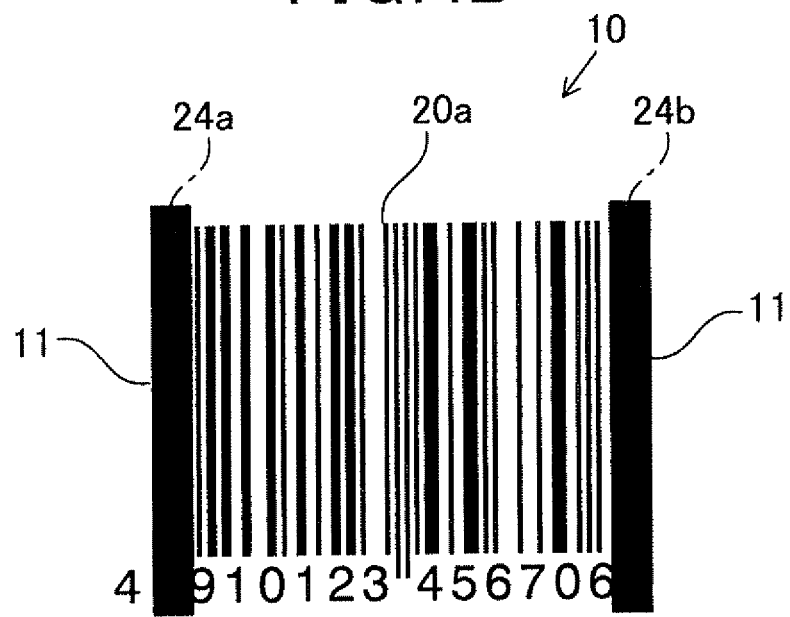

FIGS. 4(A) and 4(B) are diagrams illustrating an example of an information code according to a second variant of the first embodiment.

In the second variant of the first embodiment, the code region 20a may be configured such that a plurality of characters formed by arranging a plurality of light-colored modules and dark-colored modules is arranged in the direction of reading, as in a barcode.

In this case, as shown in FIG. 4A, the masked portion 11 is disposed to mask a predetermined region of the code region 20a in which light is intercepted and which prevents the corresponding code region 20a from being read. In this case, the code region 20a cannot be read without using the information code reader 40, thereby preventing the corresponding information code 10 from being read using an ordinary reader.

Furthermore, the effect can be achieved even when masked portions 11 are disposed to mask the start character 24a of the characters, that is, a symbol indicative of the start of reading, and a stop character 24b, that is, a symbol indicative of the end of reading, as shown in FIG. 4B. Furthermore, the effect can be achieved even when a masked portion 11 is disposed to mask at least any one of the start and stop characters 24a and 24b.

Alternatively, the effect can be achieved when the masked portion 11 is disposed to mask a predetermined region that prevents a code region 20a from being read or at least any one of a symbol indicative of the start of reading and a symbol indicative of the end of reading if the corresponding code region 20a is a one-dimensional code of a type different from that of a barcode.

Second Embodiment

Figure 5:
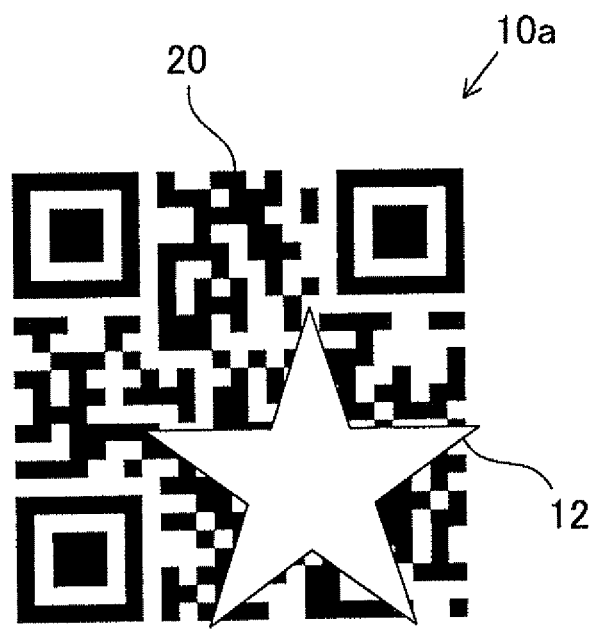
FIG. 5 is a diagram illustrating an example of an information code 10a according to a second embodiment.

Next, a second embodiment in which information code according to the present invention has been embodied will be described with reference to FIG. 5. FIG. 5 is a diagram illustrating an example of an information code 10a according to a second embodiment.

The information code 10a according to the second embodiment is different from the information code according to the first embodiment in that the information code 10a employs a masked portion 12 in the shape of a specific figure, instead of the above-described masked portion 11.

As shown in FIG. 5, more specifically, the masked portion 12 is the shape of a specific figure designed in response to the environment of use, for example, a star figure. Even when the masked portion 12 is formed in the shape of a specific figure as described above, the masked portion 12 allows light, reflected from the code region 20 when light of a second wavelength band is radiated, to pass therethrough, thereby realizing an information code 10a having enhanced security and improved design. Furthermore, although the color of the masked portion 12 in the shape of a star figure is generally and chiefly blackish because of the balanced use of ink or the like, a white star figure is illustrated in FIG. 5 for convenience of description.

The shape of the masked portion 12 is not limited to the star figure. Furthermore, the effect can still be achieved even when the masked portion 12 is designed to have a specific figure whose shape, pattern and color is varied depending on the environment of use.

Third Embodiment

Figure 6A:
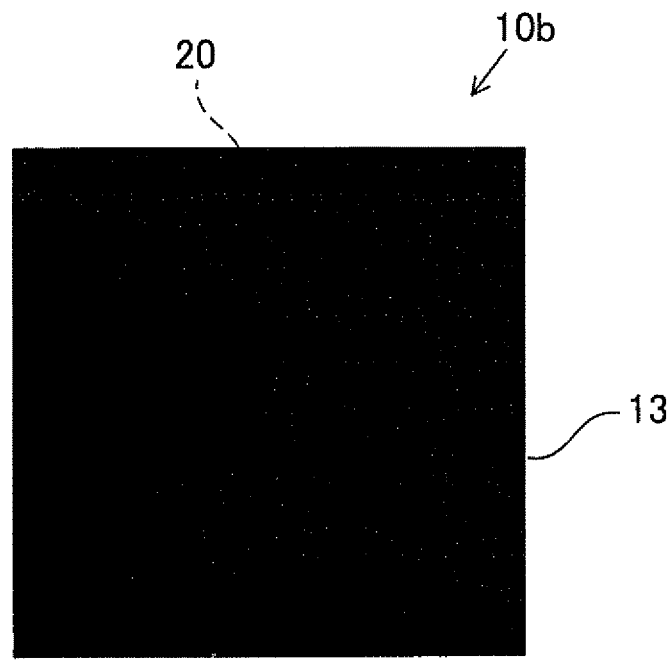
FIG. 6A is a diagram illustrating an example of an information code according to the third embodiment.
Figure 6B:
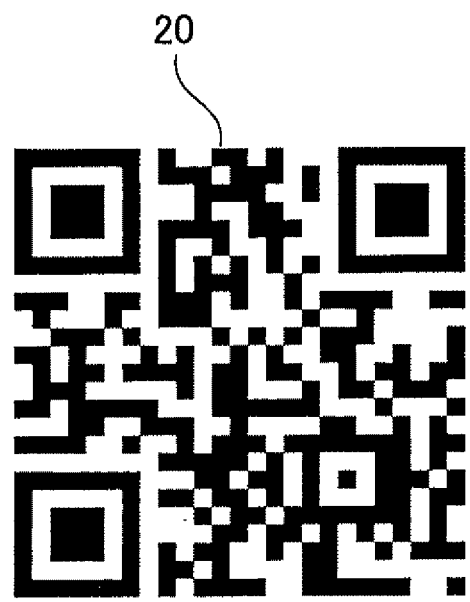
FIG. 6B is a diagram illustrating the information code of FIG. 6A with a masked portion removed therefrom.

Next, a third embodiment in which an information code according to the present invention has been embodied will be described with reference to FIGS. 6A and 6B. FIG. 6A is a diagram illustrating an example of the information code according to the third embodiment, and FIG. 6B is a diagram illustrating the information code of FIG. 6A with a masked portion removed therefrom.

The information code 10b according to the third embodiment is different from the information code according to the first embodiment in that the information code 10b employs a masked portion 13 masking the entire code region 20, instead of the above-described masked portion 11.

As shown in FIG. 6A, the masked portion 13 is disposed to mask the entire code region 20, and therefore a user cannot view the original code region 20, so that the information code 10b cannot be recognized using an ordinary reader that is used by the user, thereby reliably preventing the corresponding information code 10b from being read. When the information code reader 40 is used, capturing is performed while light of a second wavelength band is being radiated. Since the code region 20 is captured, as shown in FIG. 6B, the corresponding information code 10b can be read.

Fourth Embodiment

Figure 7A:
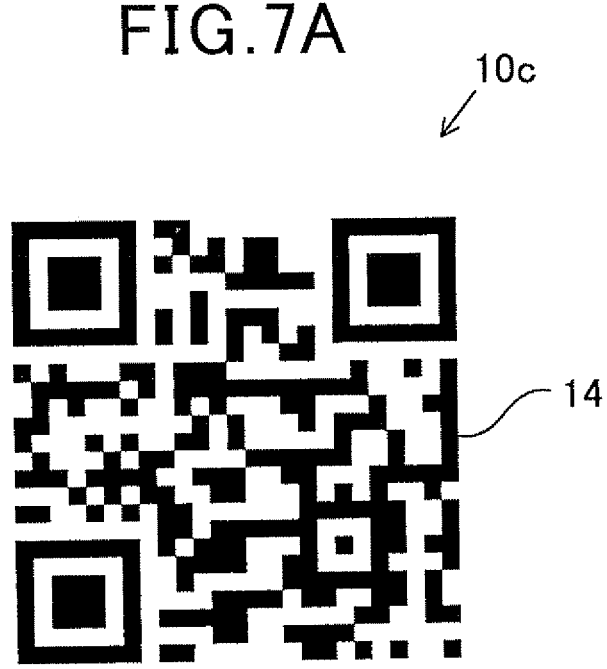
FIG. 7A is a diagram illustrating an example of an information code according to the fourth embodiment.
Figure 7B:
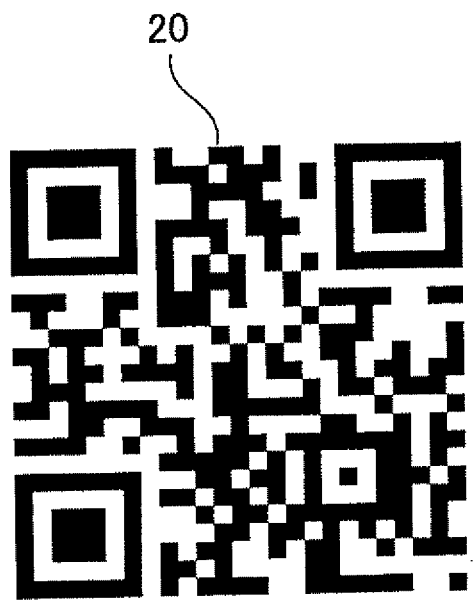
FIG. 7B is a diagram illustrating the information code of FIG. 7A with a masked portion removed therefrom.

Next, a fourth embodiment in which an information code according to the present invention has been embodied will be described with reference to FIGS. 7A and 7B. FIG. 7A is a diagram illustrating an example of the information code according to the fourth embodiment, and FIG. 7B is a diagram illustrating the information code of FIG. 7A with a masked portion removed therefrom.

The information code 10c according to the fourth embodiment is different from the information code according to the third embodiment in that the information code 10c employs a masked portion 14, instead of the above-described masked portion 13.

As shown in FIG. 7A, the masked portion 14 includes a QR code that enables predetermined information to be read, and is disposed to mask the entire code region 20. That is, the masked portion 14 includes another information code in which a plurality of light-colored modules exhibiting the reflective characteristics of light color when light of a first wavelength band is radiated and a plurality of dark-colored modules exhibiting the reflective characteristics of dark color when light of a first wavelength band is radiated are arranged.

As a result, the corresponding masked portion 14 is read as a common information code by an ordinary reader, and therefore the code region 20 coated with the masked portion 14 cannot be read without using the information code reader 40. In particular, when light of a second wavelength band is radiated, the code region 20 coated with the masked portion 14 can be captured, as shown in FIG. 7B. In contrast, when light of a first wavelength band is radiated, another information code formed of the masked portion 14 can be captured, as shown in FIG. 7A. For this reason, the information code reader 40 capable of radiating light of two wavelength bands is used. Since two types of information can be read from the space of a single information code, the efficiency of code space can be achieved.

The masked portion 14 may use a mask pattern that varies the feature of each module, and include a QR code in which the features of the modules constitute the code region 20. In greater detail, a mask pattern in which a plurality of light-colored modules and dark-colored modules have been arranged in a matrix is prepared. Furthermore, the masked portion 14 is configured such that when the mask pattern is superimposed on the code region 20, a dark-colored module is disposed at a location where modules of the same color are superimposed on each other and a light-colored module is disposed at a location where modules of different colors are superimposed on each other.

Accordingly, the masked portion 14 is configured so that the features of the modules of the code region 20 vary depending on the mask pattern. Accordingly, an ordinary reader needs to remove the mask pattern after capturing the masked portion 14, while the information code reader 40 can capture and read the code region 20 without performing the removal process.

Figure 8A:
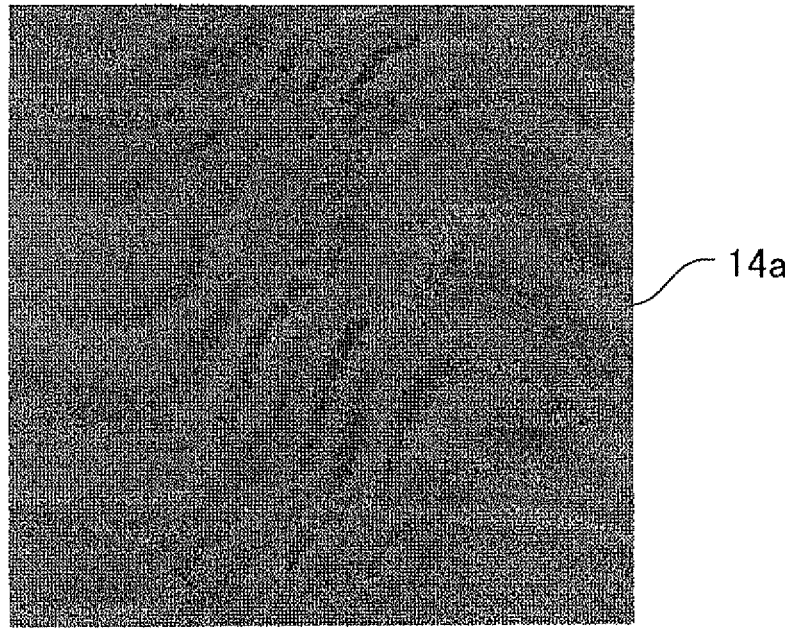
Figure 8B:
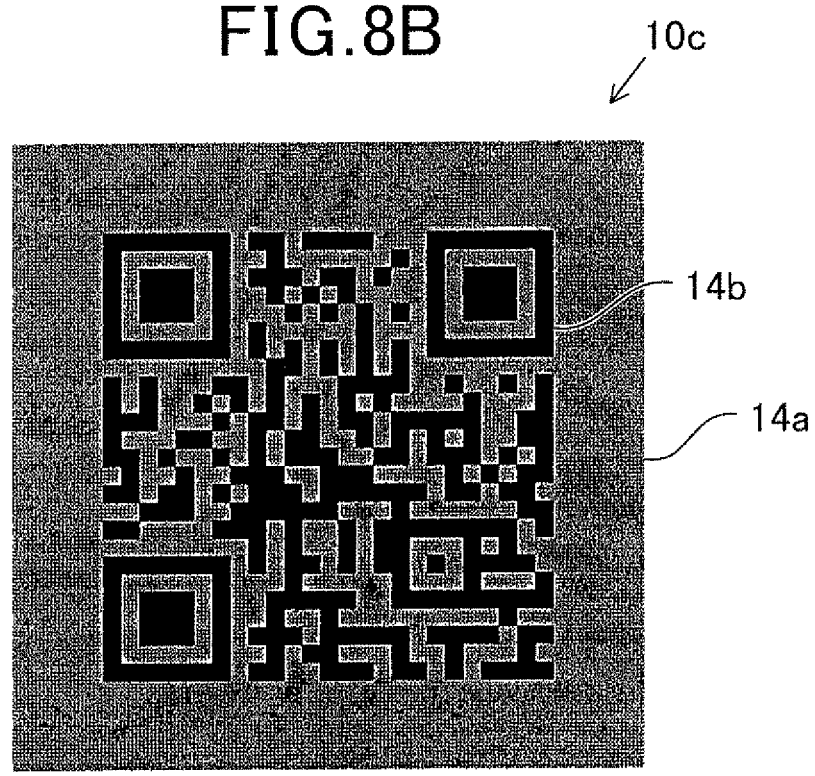

In a first variant of the fourth embodiment, a masked portion 14 may be formed of a QR code that is formed by applying infrared ray-transmittable ink of different concentrations and enables predetermined information to be read. This specific example will now be described with reference to FIGS. 8A and 8B. FIGS. 8A and 8B are diagrams illustrating an example of an information code according to a first variant of the fourth embodiment, wherein FIG. 8A illustrates the application of a base 14a, and FIG. 8B is the printing of a QR code on the base 14a.

As shown in FIG. 8A, the base 14a is formed by lightly coating a target code region 20 with infrared ray-transmittable ink so that the code region 20 cannot be recognized. Furthermore, as shown in FIG. 8B, a dark-colored module region 14b is formed by applying infrared ray-transmittable ink. By doing this, a masked portion 14 that masks the code region 20 is formed.

Even in this case, the code region 20 is prevented from being read by an ordinary reader, and two types of information can be read from the space of a single information code using the information code reader 40 capable of radiating light of two wavelength bands, thereby achieving the efficiency of code space.

Meanwhile, the masked portion 14 or dark-colored module region 14b is not limited to a portion or region of a type identical to that of the target code region 20 (in the present embodiment, a QR code), but may be a different type of information code. Furthermore, the masked portion 14 or base 14a is not limited to a portion or base disposed to mask the entire code region 20, but is disposed to mask a predetermined region that prevents the code region 20 from being read, like the masked portion 11.

Fifth Embodiment

Figure 9A:
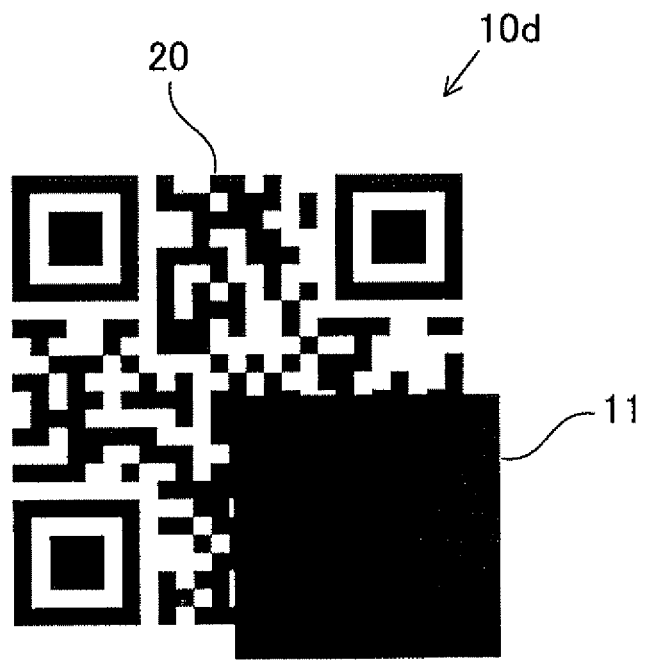
FIGS. 9A and 9B are diagrams illustrating an example of an information code according to the fifth embodiment.

Next, a fifth embodiment in which an information code according to the present invention has been embodied will be described with reference to FIGS. 9A and 9B. FIG. 9A is a diagram illustrating an to example of an information code 10d according to the fifth embodiment, and FIG. 9B is a diagram illustrating the information code 10d of FIG. 9A with a masked portion 11 removed therefrom.

The information code 10d according to the fifth embodiment is different from the information code according to the first embodiment in that the information code 10d employs a second masked portion 30 in addition to the above-described masked portion 11.

Figure 9B:
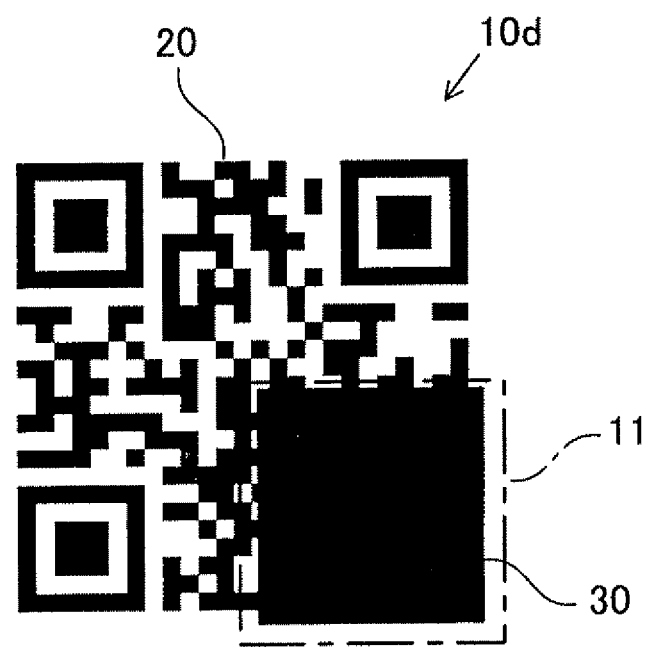

The second masked portion 30 is formed of material having transparency at a temperature higher than room temperature, and has a size almost identical to that of the masked portion 11 and is disposed at a location almost identical to that of the masked portion 11, with respect to the code region 20, as shown in FIGS. 9(A) and 9(B).

Even when the information code 10d configured as described above is captured while light of a second wavelength band is being radiated, the information code 10d is captured with the code region 20 coated with the second masked portion 30, as shown in FIG. 9B. That is, the code region 20 cannot be captured to be read with respect for the second masked portion 30 only by the radiation of the light of a second wavelength band, and the second masked portion 30 needs to be higher than room temperature to enable the second masked portion 30 to transmit light.

For this reason, only a specific user who uses a specific reader capable of radiating light of a second wavelength band and heating the second masked portion 30 can read specific information from the code region 20, thereby preventing the corresponding information code 10d from being read by an ordinary reader.

Furthermore, the second masked portion 30 is not limited to a portion that has a size almost identical to that of the masked portion 11 and is disposed on the identical location with respect to the code region 20, but may have a different size or may be disposed at a different location as long as it coats at least the predetermined region.

Sixth Embodiment

Figure 10A:
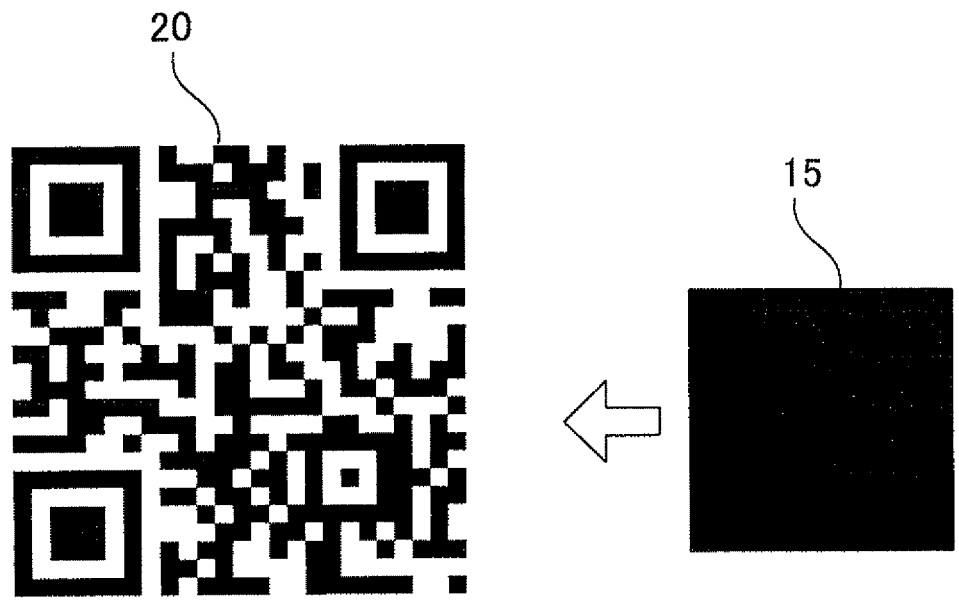
Figure 10B:
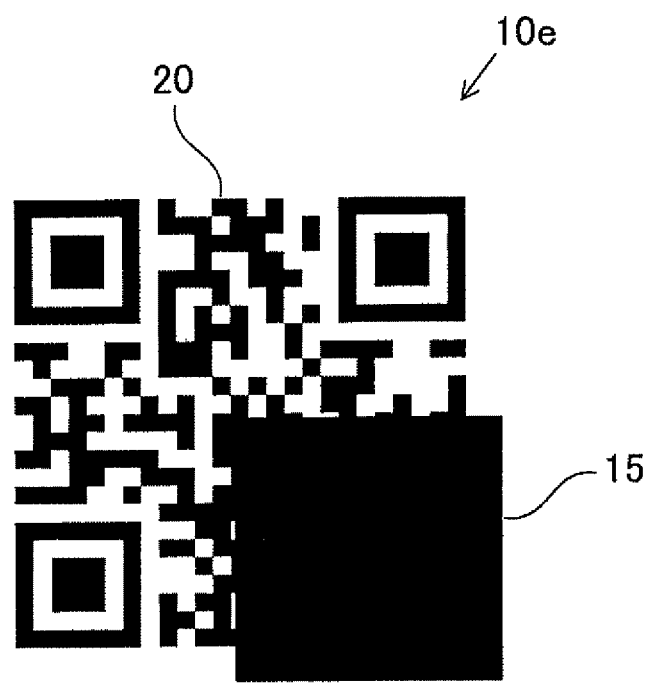

Next, a sixth embodiment in which an information code according to the present invention has been embodied will be described with reference to FIGS. 10A and 10B. FIGS. 10A and 10B are diagrams illustrating an example of an information code 10e according to a sixth embodiment, wherein FIG. 10A shows a code region 20 with a masked portion 15 removed therefrom, and FIG. 10B shows the code region 20 whose part is coated with a masked portion 15.

The information code 10e according to the sixth embodiment is different from the information code according to the first embodiment in that a masked portion 15 separate from a code region 20 is employed, instead of the above-described masked portion 11.

In detail, the masked portion 15 is formed of a seal member that is formed of an infrared ray-transmittable material that allows light of a second wavelength band to pass therethrough and thereby interrupts light of a first wavelength band. The masked portion 15 is formed separately so that it can be added to a predetermined region when desired.

Using the above embodiment, an existing information code can be prevented from being read using an ordinary reader by coating the predetermined region of an existing information code with the masked portion 15 configured as described above. In contrast, when reading is performed using the information code reader 40 capable of radiating light of a second wavelength band, the information code can be reliably read.

In particular, since the masked portion 15 is formed of the seal member, the predetermined region of an existing information code can be easily coated with the corresponding masked portion 15.

Figure 11:
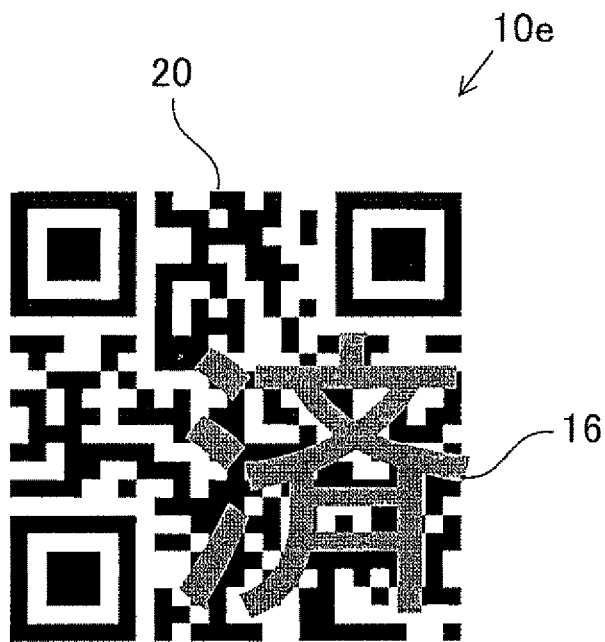
FIG. 11 is a diagram illustrating an example of an information code according to a first variant of the sixth embodiment.

FIG. 11 is a diagram illustrating an example of an information code 10e according to a variant of the sixth embodiment.

In the variant of the sixth embodiment, the masked portion 16 may be configured by adding infrared ray-transmittable ink in such a way as to apply (print) the infrared ray-transmittable ink onto the predetermined region. Even in this case, the predetermined region of an existing information code can be easily coated with the corresponding masked portion 16.

Using the above variant, the reading of an ordinary QR code by an ordinary reader is rendered impossible or difficult by, for example, applying (printing) a desired letter, such as a Japanese kanji (as shown in FIG. 11), onto the ordinary QR code using infrared ray-transmittable ink as the masked portion 16, as shown in FIG. 11. For example, when management is inconvenient because a code has to be read again (in the case of the inspection of products, the inspection of inventory in a warehouse, etc.), reading is prevented from being performed twice using an ordinary reader, so that the completion of the reading of the corresponding QR code can be easily seen and the redundant reading of the information code can be prevented. It will be apparent that in a seal member like the masked portion 15, the same effect can be achieved using the above-described masked portion 16.

Meanwhile, when reading is required even after the desired letter has been applied (printed) onto the QR code as the masked portion 16 because reading has completed, the corresponding QR code can be read by performing reading using the information code reader 40 capable of radiating light of a second wavelength band.

Furthermore, the masked portion configured separately, like the code region 20, is not limited to a portion formed by adding a seal member or applying ink, like the masked portions 15 and 16, but may be configured such that a member made of a material that allows light of a second wavelength band to pass therethrough and thereby interrupts light of a first wavelength band is added to the predetermined region later using, for example, a printing or stamping method.

Seventh Embodiment

Figure 12:
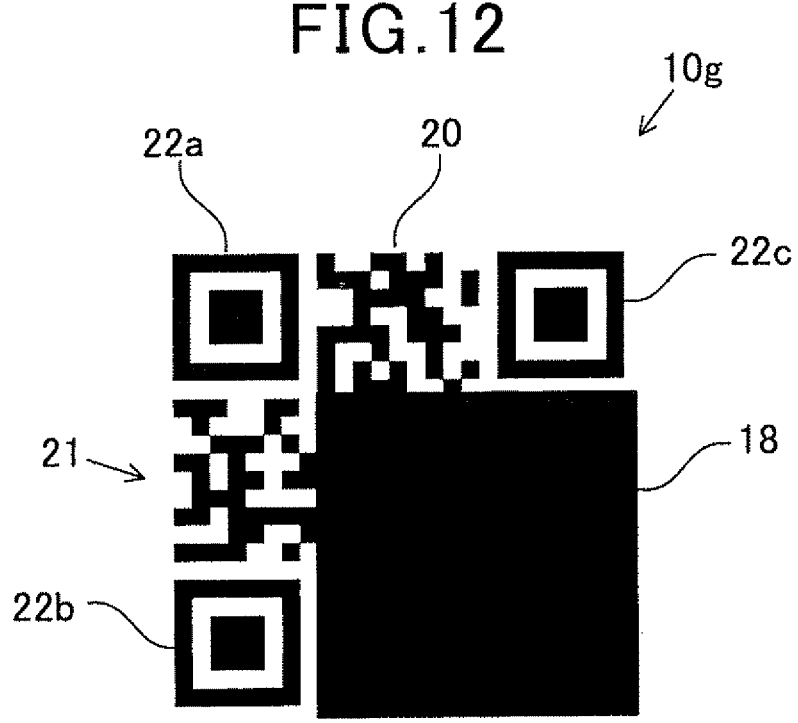
FIG. 12 is a diagram illustrating an example of an information code according to a seventh embodiment.

Next, a seventh embodiment in which an information code according to the present invention has been embodied will be described with reference to FIG. 12. FIG. 12 is a diagram illustrating an example of an information code 10g according to the seventh embodiment.

As described in FIG. 12, the information code 10g according to the seventh embodiment is different from the information code according to the first embodiment in that the above-described masked portion 18 is disposed to mask the region other than the location detection patterns 22a to 22c.

In this case, the region other than the location detection patterns 22a to 22c, which is coated with the masked portion 18, cannot be recognized without reading the information code 10g using the information code reader 40, thereby preventing the corresponding information code 10g from being read using an ordinary reader.

Meanwhile, since the location detection patterns 22a to 22c are not coated with the masked portion 18, a user can be visually notified of the presence of the corresponding location detection patterns 22a to 22c. For this reason, the user can recognize the locations of the location detection patterns 22a to 22c, so that the corresponding information code 10g can be reliably read by accurately directing the reading unit of the information code reader 40 toward the corresponding information code 10g when the information code reader 40 is used.

Figure 13A:
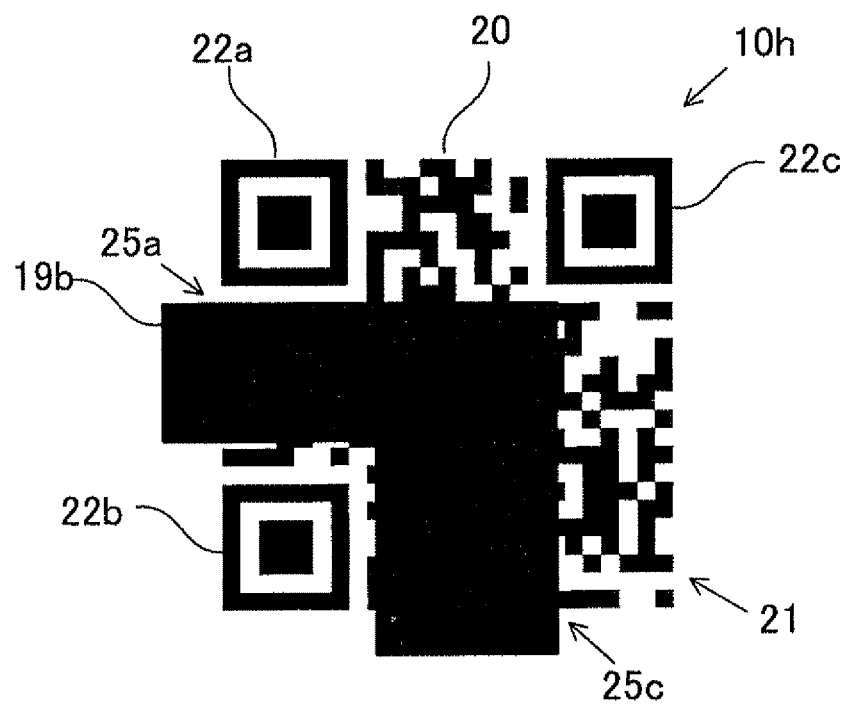
FIG. 13A is a diagram schematically illustrating an information code according to a variant of the foregoing embodiments.
Figure 13B:
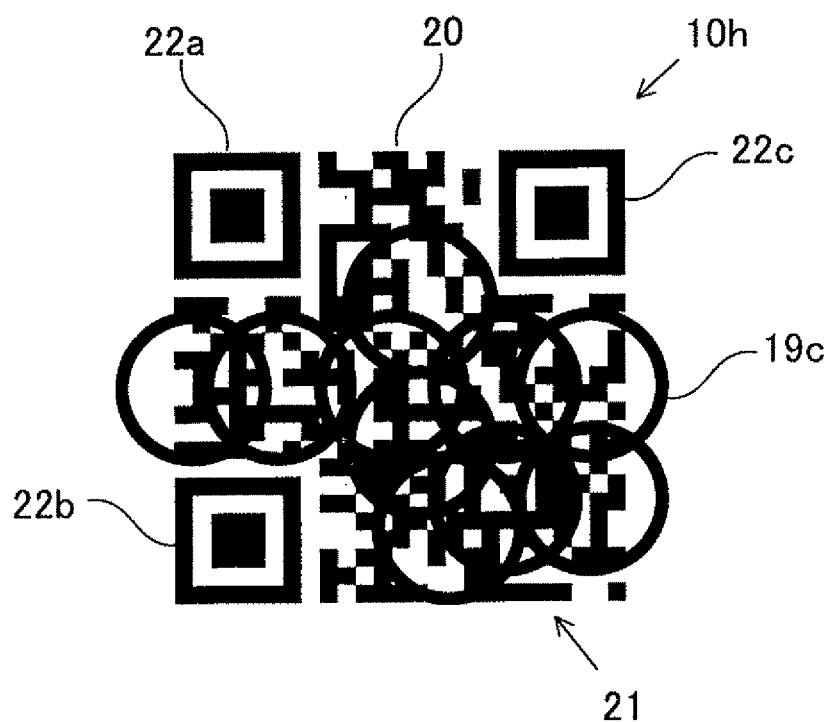
FIG. 13B is a diagram schematically illustrating an information code according to another variant of the foregoing embodiments.

FIG. 13A is a diagram schematically illustrating an information code according to a first variant of the foregoing embodiments, and FIG. 13B is a diagram schematically illustrating an information code according to a second variant of the foregoing embodiments.

As shown in FIG. 13A, a masked portion 19b may be disposed to mask an L-shaped region extending from the left edge 25a of a code region 20 to the bottom edge 25c thereof. Alternatively, as shown in FIG. 13B, a masked portion 19c may be configured to connect a plurality of figures (in the example of FIG. 13B, circles) and disposed to mask a region extending from some edges of a code region 20 to another edge thereof.

Eighth Embodiment

Figure 14:
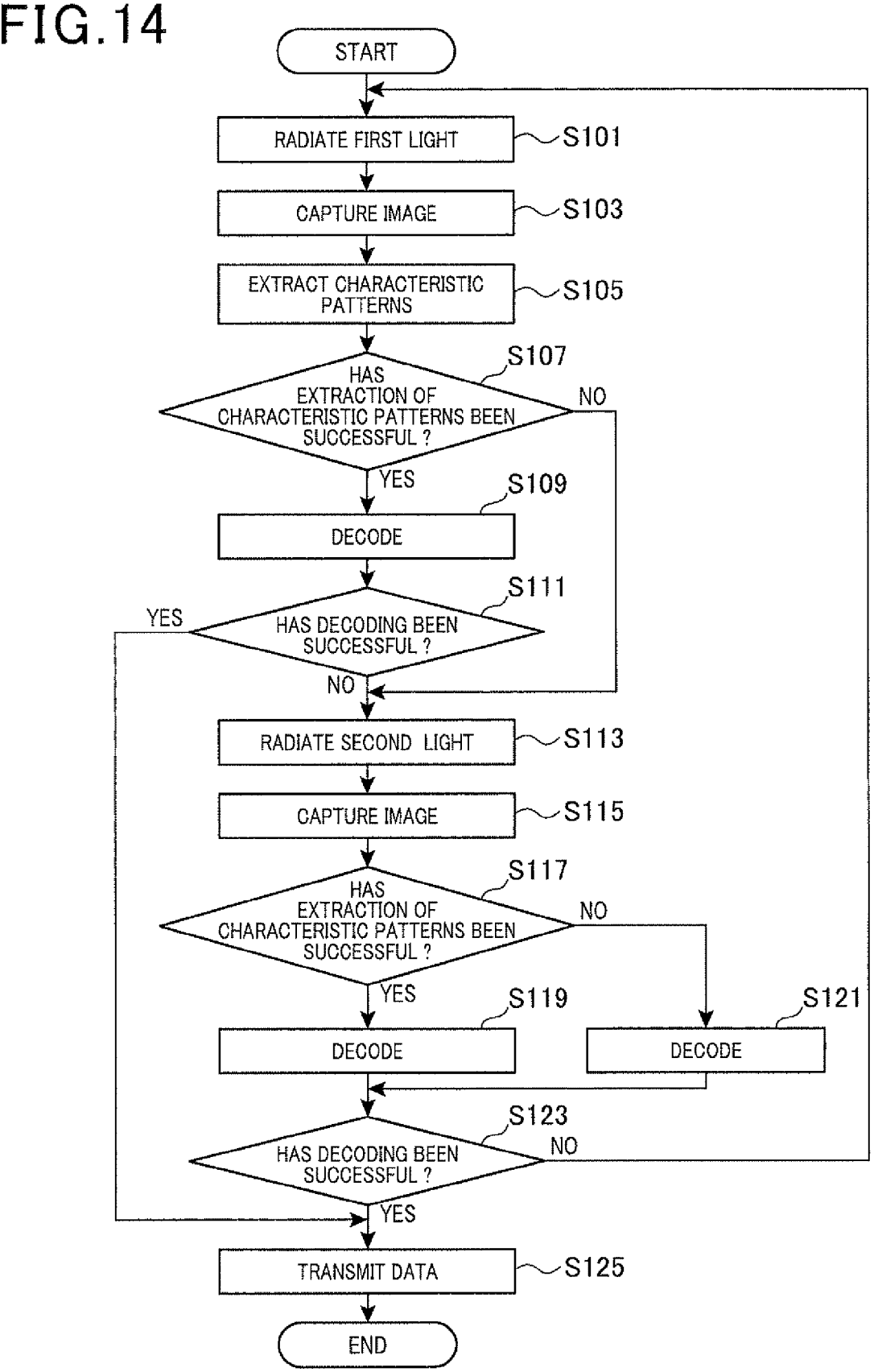
FIG. 14 is a flowchart illustrating a reading process that is performed by an information code reader according to an eighth embodiment.

Next, an eighth embodiment in which an information code reader for optically reading an information code according to the present invention has been embodied will be described with reference to FIG. 14. FIG. 14 is a flowchart illustrating a reading process that is performed by the information code reader according to the eighth embodiment.

The information code reader 40 according to the eighth embodiment is intended to be used for information codes each of which has a masked portion disposed to mask the code region 20 except for characteristic pattern regions (the location detection patterns 22a to 22c), like the above-described information codes 10g and 10h. The information code reader 40 according to the ninth embodiment is different from the information code reader according to the first embodiment in that the information code reader 40 reads an information code using already extracted characteristic pattern regions.

The reading process that is performed by the information code reader according to the present embodiment will be described in detail below with reference to the flowchart of FIG. 14.

When an information code, that is, a reading target, is brought to a predetermined location near the information code reader 40, the reading process is initiated. First, first illumination light is radiated by the first illumination light sources 43 (first illumination light radiation means) at step S101. Thereafter, while the first illumination light is being radiated onto the information code and second illumination light is not being radiated onto the information code, the corresponding information code is captured using the imaging unit 42 at step S103. Thereafter, characteristic pattern regions are extracted from a captured image of the information code using a known extraction method at step S105.

A method of extracting characteristic pattern regions has been generally determined according to the type of information code in specifications or the like. In the case of the QR code illustrated in FIG. 12, location detection patterns are extracted as characteristic pattern regions using a known method for extracting the location detection patterns of QR code. Thereafter, it is determined whether the extraction of the characteristic patterns at step S105 has been successful at step S107. If the extraction of the characteristic pattern regions has been successful (Yes at step S107), the process proceeds to step S109 where decoding is performed using a known method for the type of information code, that is, a reading target. If the decoding has been successful at step S109, it may be concluded that a masked portion such as the masked portion 18 shown in FIG. 12 is not present. In this case (Yes at step S111), the process proceeds to step S125 where the transmission of data to the outside is performed, thereby terminating the corresponding reading process.

Meanwhile, for example, if the captured information code is the information code 10g shown in FIG. 12, the decoding fails because the data region 21 is coated with the masked portion 18 even when the respective location detection patterns 22a to 22c are extracted at step S105. In this case (No at step S111), second illumination light is radiated by the second illumination light sources 44 at step S113. Thereafter, while second illumination light is being radiated onto the information code log and first illumination light is not being radiated by the first illumination light sources 43, the information code log is captured by the imaging unit 42 at step S115. Thereafter, since the extraction of the characteristic patterns at step S105 has been successful (Yes at step S117), decoding is performed at step S119 using the results of the extraction (which was performed at step S115) of the characteristic patterns. In this case, the locations of the respective location detection patterns 22a to 22c (characteristic pattern regions) are found, and therefore the locations of the respective location detection patterns 22a to 22c do not need to be newly detected, so that this processing is shortened or eliminated, thereby achieving rapid decoding. At second illumination step S113, when the location detection patterns 22a to 22c are extracted, second illumination light may be radiated onto only what is estimated to be a code region based on the location detection patterns 22a to 22c. By doing so, power consumption can be reduced.

Since the extraction of the characteristic patterns has been successful (No at step S107), second illumination light is radiated and the information code is captured while the second illumination light is being radiated. In this case (No at step S117), decoding is performed at step S121. At a decoding step at S121, processing including the extraction of the characteristic pattern regions is performed. After step S119 or S121, it is determined whether the decoding has been successful at step S123. If the decoding has been successful (Yes at step S123), the transmission of data to the outside is performed at step S125, thereby terminating the reading process. Meanwhile, if it is determined that the decoding has not been successful at step S123 (No at step S123), the process following step S101 is repeated.

Meanwhile, the second illumination light sources 44 may correspond to an example of illumination means, the imaging unit 42 may correspond to capturing means, and the control unit 41 may be an example of reading means.

As described above, in the information code reader 40 according to the present embodiment, when the location detection patterns 22a to 22c are extracted as characteristic pattern regions and the code region 20 is not extracted from an image that is captured while light of a first wavelength band is being radiated, light of a second wavelength band is radiated. In the image captured under the above illumination, the location of the code region 20 is specified based on the location detection patterns 22a to 22c extracted while light of a first wavelength band is being radiated, and the corresponding code region 20 is read based on the arrangement of the modules that constitute the extracted code region 20 whose location is specified.

In the case of reading an information code which has a masked portion disposed to mask the region other than characteristic pattern regions, like the information code 10g shown in FIG. 12 when the information code is captured while light of a first wavelength band is being radiated, the corresponding code region 20 is not extracted and cannot be read even when the location detection patterns 22a to 22c of the code region 20 are extracted. In this case, when capturing is performed at the same capturing location while light of a second wavelength band is being radiated after the extraction of the location detection patterns 22a to 22c, the location of the code region 20 can be specified based on the extracted location detection patterns 22a to 22c, as described above. By doing so, the extraction of the location detection patterns 22a to 22c is not necessary, so that the time it takes to read the corresponding information code can be shortened and the load of the reading process can be reduced.

Furthermore, the information code reader 40 is not limited to the reader configured to radiate the first illumination light using the first illumination light sources 43, but may be a reader without the first illumination light sources 43, which uses surrounding illumination.

Moreover, the present invention is not limited to the embodiments and their variants, but may be embodied, as follows:

(1) The light of a second wavelength band is not limited to infrared light of a wavelength band equal to or above 750 nm in wavelength, but may be, for example, ultraviolet light of a wavelength band equal to or below 380 nm in wavelength. In this case, the masked portions 11 to 19 and 19a to 19c may be configured to allow light reflected from the modules of the code region 20 to pass therethrough when infrared light is radiated.

The light of a first wavelength band is not limited to visible light of a wavelength in the range of 380 nm to 750 nm, but may be light of a wavelength band that is different from that of the light of a second wavelength band and that cannot pass through the masked portions 11 to 19 and 19a to 19c.

(2) The code region 20 is not limited to a code in which a plurality of light-colored modules and dark-colored modules are arranged in two dimensions, like a QR code, but may be a different type of code, such as a one-dimensional code (a barcode) or a two-dimensional code (a data matrix code, and a MaxiCode).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An information code comprising:
a plurality of light-colored modules exhibiting reflective characteristics of light color when light of a second wavelength band different in wavelengths from light of a first wavelength band is radiated to the light-colored modules;
a plurality of dark-colored modules exhibiting reflective characteristics of dark color when the light of the second wavelength band is radiated to the dark-colored modules, the light-colored and dark-colored modules being arranged in a code region of the code; and
a masked portion disposed in a predetermined region of the code region, the predetermined region preventing the information code from being decoded when the predetermined region is intercepted from being lighted, the masked portion (i) allowing light reflected from the modules of the code region to pass through the masked region when the light of the second wavelength band is radiated to the code region and (ii) interrupting the light of the first wavelength band from passing through the masked region.

2. The information code of claim 1, wherein:
the code region is configured such that a plurality of characters formed by arranging a plurality of modules of both the light-colored and dark-colored modules are arranged in a direction of reading the information code; and
the masked portion is disposed in the predetermined region to mask at least any one of a start character and an end character of the characters, the start character being a symbol indicating a start of the reading and a stop character being a symbol indicating an end of the reading.

3. The information code of claim 1, wherein:
the corresponding information code is a two-dimensional code in which location detection regions configured to specify locations are included in the code region, the location detection regions composing the predetermined region; and
the masked portion is disposed to mask the location detection regions.

4. The information code of claim 1, wherein:
the corresponding information code is a two-dimensional code in which location detection regions configured to specify locations and format information regions configured to acquire format information for reading the corresponding information code are included in the code region, the location detection regions and the format information regions composing the predetermined region; and
the masked portion is disposed to mask at least one of the location detection regions and the format information regions.

5. The information code of claim 1, wherein:
the corresponding information code is a two-dimensional code in which characteristic pattern regions are disposed at predetermined locations in the code region, the characteristic pattern regions being formed in defined shapes; and
the masked portion is disposed to mask a part of the characteristic pattern regions as the predetermined region.

6. The information code of claim 1, wherein:
the information code is a two-dimensional code in which characteristic pattern regions are disposed at predetermined locations in the code region, the characteristic pattern regions being formed in defined shapes; and
the masked portion is disposed to mask an area other than the characteristic pattern regions, the area composing the predetermined region.

7. The information code of claim 1, wherein the masked portion is formed in a shape of a figure whose shape, pattern or color is arbitrarily chosen.

8. The information code of claim 1, wherein the masked portion is disposed to mask the entire code region.

9. The information code of claim 1, wherein the masked portion is configured as a second information code in which a plurality of light-colored modules exhibiting reflective characteristics of light color when the light of the second wavelength band is radiated to the light-colored modules and a plurality of dark-colored module exhibiting reflective characteristics of dark color when light of the second wavelength band is radiated to the dark-colored modules are arranged, the second information code having information different from information acquired from the code region.

10. The information code of claim 1, wherein a second masked portion having transparency at a temperature higher than a room temperature is disposed in the predetermined region in which the masked portion is disposed.

11. The information code of claim 1, wherein the masked portion is configured as a separate portion capable of being added to the predetermined region when desired.

12. The information code of claim 11, wherein the masked portion is added by attaching a seal member to the predetermined region when desired.

13. The information code of claim 11, wherein the masked portion is added by applying ink onto the predetermined region when desired.

14. The information code of claim 2, wherein the masked portion is formed in a shape of a figure whose shape, pattern or color is arbitrarily chosen.

15. The information code of claim 2, wherein a second masked portion having transparency at a temperature higher than a room temperature is disposed in the predetermined region in which the masked portion is disposed.

16. The information code of claim 2, wherein the masked portion is configured as a separate portion capable of being added to the predetermined region when desired.

17. The information code of claim 3, wherein the masked portion is formed in a shape of a figure whose shape, pattern or color is arbitrarily chosen.

18. The information code of claim 3, wherein a second masked portion having transparency at a temperature higher than a room temperature is disposed in the predetermined region in which the masked portion is disposed.

19. An information code reader for optically reading an information code comprising:
a plurality of light-colored modules exhibiting reflective characteristics of light color when light of a second wavelength band different in wavelengths from light of a first wavelength band is radiated to the light-colored modules;
a plurality of dark-colored modules exhibiting reflective characteristics of dark color when the light of the second wavelength band is radiated to the dark-colored modules, the light-colored and dark-colored modules being arranged in a code region of the code; and
a masked portion disposed in a predetermined region of the code region, the predetermined region preventing the information code from being decoded when the predetermined region is intercepted from being lighted, the masked portion (i) allowing light reflected from the modules of the code region to pass through the masked region when the light of the second wavelength band is radiated to the code region and (ii) interrupting the light of the first wavelength band from passing through the masked region,
the information code reader comprising:
illumination means capable of radiating at least the light of the second wavelength band of the light;
capturing means for capturing an image of the information code onto which any one of the light of the first wavelength band and the light of the second wavelength band is radiated; and
reading means for decoding the code region based on an arrangement of the modules that are extracted from the image of the information code captured by the capturing means.

20. An information code reader for optically reading an information code comprising:
a plurality of light-colored modules exhibiting reflective characteristics of light color when light of a second wavelength band different in wavelengths from light of a first wavelength band is radiated to the light-colored modules;
a plurality of dark-colored modules exhibiting reflective characteristics of dark color when the light of the second wavelength band is radiated to the dark-colored modules, the light-colored and dark-colored modules being arranged in a code region of the code; and
a masked portion disposed in a predetermined region of the code region, the predetermined region preventing the information code from being decoded when the predetermined region is intercepted from being lighted, the masked portion (i) allowing light reflected from the modules of the code region to pass though the masked region when the light of the second wavelength band is radiated to the code region and (ii) interrupting the light of the first wavelength band from passing through the masked region,
wherein the information code is a two-dimensional code in which characteristic pattern regions are disposed at predetermined locations in the code region, the characteristic pattern regions being formed in defined shapes;
the masked portion is disposed to mask an area other than the characteristic pattern regions, the area composing the predetermined region; and
the characteristic pattern regions are location detection regions configured to specify a location of the code region,
the information code reader comprising:
illumination means capable of radiating at least the light of the second wavelength band of the light;

capturing means for capturing an image of the information code onto which any one of the light of the first wavelength band and the light of the second wavelength band is radiated; and decoding means for specifying a location of the code region based on the location detection regions extracted from the image of the information code captured by the capturing means, and decoding the code region based on an arrangement of the modules of the extracted code region whose location is specified;

wherein the illumination means radiates the light of the second wavelength band if the location detection regions are extracted and the code region is not extracted from the image while the light of the first wavelength band is being radiated; and wherein the decoding means, with respect to the image that is captured by the capturing means while the light of the first wavelength band is being radiated, specifies the location of the code region based on the location detection regions extracted while the light of the first wavelength band is being radiated, and decodes the code region based on the arrangement of the modules of the extracted code region whose location is specified.

\* \* \* \* \*